United States Patent
Troy et al.

(10) Patent No.: US 10,585,167 B2
(45) Date of Patent: Mar. 10, 2020

(54) RELATIVE OBJECT LOCALIZATION PROCESS FOR LOCAL POSITIONING SYSTEM

(71) Applicant: The Boeing Company, Chicago, IL (US)

(72) Inventors: James J. Troy, Issaquah, WA (US); Scott W. Lea, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/386,597

(22) Filed: Apr. 17, 2019

(65) Prior Publication Data
US 2019/0242971 A1 Aug. 8, 2019

Related U.S. Application Data

(63) Continuation of application No. 14/222,368, filed on Mar. 21, 2014, now Pat. No. 10,310,054.

(51) Int. Cl.
*G01S 5/02* (2010.01)
*G01B 11/00* (2006.01)
*G01S 7/497* (2006.01)
*G01S 5/16* (2006.01)

(52) U.S. Cl.
CPC .............. *G01S 5/16* (2013.01); *G01S 5/0284* (2013.01); *G01B 11/00* (2013.01); *G01S 7/497* (2013.01)

(58) Field of Classification Search
None
See application file for complete search history.

(56) References Cited

U.S. PATENT DOCUMENTS

| 4,659,971 | A | * | 4/1987 | Suzuki | G05B 19/425 318/568.19 |
| 5,586,063 | A | * | 12/1996 | Hardin | G01C 3/10 324/160 |
| 6,288,785 | B1 | * | 9/2001 | Frantz | A61B 5/06 250/559.29 |
| 6,670,906 | B1 | * | 12/2003 | Roberts | G01S 5/0284 342/22 |
| 6,710,713 | B1 | * | 3/2004 | Russo | A63B 24/0021 340/573.1 |

(Continued)

*Primary Examiner* — John E Breene
*Assistant Examiner* — Brandon J Becker
(74) *Attorney, Agent, or Firm* — Ostrager Chong Flaherty & Broitman P.C.

(57) ABSTRACT

Systems and methods for performing relative object localization using a local positioning system. The process in accordance with one embodiment solves the problem of determining the location (i.e., the position and orientation) of an object relative to a previous location of the object, or relative to another object, without the need for known 3-D data point positions in the environment. The process in accordance with another embodiment solves the problem of determining the location of the measurement instrument relative to a previous location of the measurement instrument using visible feature points on a target object as a reference, again without the need for known 3-D data point positions. The process in accordance with a further embodiment is capable of determining the locations of multiple objects relative to each other.

20 Claims, 5 Drawing Sheets

(56) References Cited

U.S. PATENT DOCUMENTS

| | | | | |
|---|---|---|---|---|
| 7,194,111 B1* | 3/2007 | Schaum | | G01V 8/10 348/144 |
| 7,859,655 B2* | 12/2010 | Troy | | G01C 1/04 348/169 |
| 8,447,805 B2 | 5/2013 | Troy et al. | | |
| 8,744,133 B1 | 6/2014 | Troy et al. | | |
| 9,043,146 B2 | 5/2015 | Troy et al. | | |
| 9,182,487 B2 | 11/2015 | Troy et al. | | |
| 9,441,820 B1* | 9/2016 | Linnell | | G01J 1/4257 |
| 9,804,577 B1* | 10/2017 | Troy | | G05B 15/02 |
| 2001/0055063 A1* | 12/2001 | Nagai | | G01S 5/16 348/116 |
| 2002/0049530 A1* | 4/2002 | Poropat | | G01S 5/16 701/23 |
| 2002/0167726 A1* | 11/2002 | Barman | | G01B 11/00 359/458 |
| 2003/0136249 A1* | 7/2003 | Inoue | | F41H 11/12 89/1.13 |
| 2003/0144765 A1* | 7/2003 | Habibi | | B25J 9/1697 700/259 |
| 2004/0136706 A1* | 7/2004 | Takahashi | | G03B 13/04 396/281 |
| 2005/0100192 A1* | 5/2005 | Fujimura | | G06K 9/00369 382/103 |
| 2006/0184013 A1* | 8/2006 | Emanuel | | G01S 5/16 600/426 |
| 2006/0197840 A1* | 9/2006 | Neal | | G01S 3/7864 348/169 |
| 2007/0201040 A1* | 8/2007 | Konetschny | | G01S 1/70 356/601 |
| 2009/0290163 A1* | 11/2009 | Dubois | | G01B 11/00 356/450 |
| 2011/0149266 A1* | 6/2011 | Motzer | | G01C 21/16 356/4.01 |
| 2011/0270270 A1* | 11/2011 | Vancamberg | | A61B 34/10 606/130 |
| 2012/0050528 A1* | 3/2012 | Davies | | G01C 11/02 348/136 |
| 2013/0040656 A1* | 2/2013 | Sheikh | | G01C 22/006 455/456.1 |
| 2013/0158947 A1* | 6/2013 | Suzuki | | G01B 11/00 702/155 |
| 2013/0176553 A1* | 7/2013 | Cope | | G01N 21/359 356/51 |

* cited by examiner

RELATIVE OBJECT LOCALIZATION PROCESS FOR LOCAL POSITIONING SYSTEM

RELATED PATENT APPLICATION

This application is a continuation of and claims priority from U.S. patent application Ser. No. 14/222,368 filed on Mar. 21, 2014, which issued as U.S. Pat. No. 10,310,054 on Jun. 4, 2019.

BACKGROUND

This disclosure generally relates to systems and methods for tracking the locations of a movable target object (e.g., a robotic arm or other electro-mechanical machine that is guided by a computer program) as it moves relative to a workpiece or part.

Applications involving manufacturing processes that use crawler vehicles or other computer-controlled electro-mechanical machines often employ location tracking in a reference coordinate system. Absolute motion tracking refers to tracking of position and/or orientation defined in a reference coordinate system, such as an airplane coordinate system.

Pointing instruments that can highlight a position or region on a target object, in the local coordinate system of that object, can provide valuable point-of-use information for applications in areas such as automated manufacturing. For example, a Local Positioning System (LPS) of the type disclosed in U.S. Pat. No. 7,859,655 (the disclosure of which is incorporated by reference herein in its entirety) permits an operator to acquire local coordinate measurement and imaging data for an object in the field of view of the physical hardware of the LPS. An LPS may use a pan-tilt unit to orient a camera in the direction of a target object for which local coordinates are needed. A laser range meter can be used to measure range to the object, or distances can be entered or derived algorithmically. Image data, measured range data, and pan-tilt angles are used along with known calibration points to determine the location of the LPS device relative to the target object. With the relative location known, LPS measurements are converted into the local coordinates of the target object's coordinate system (such as airplane or building coordinates). An operator may control the pan-tilt unit, laser range meter, camera devices and other software operations of an LPS using keyboard controls, or interface devices such as joysticks, gamepad controllers, mouse devices, etc. The LPS includes a computer system physically attached to, and collocated with, other components of the LPS.

The LPS disclosed in U.S. Pat. No. 7,859,655 uses known 3-D points on a target object to perform an instrument-to-target calibration, after which the system can be used to make measurements of other points or groups of points in the coordinate system of the target object. This approach for calibration works well if accurate 3-D point data is available for the target object; but in many potential use cases it is not, which mean this mode of LPS operation cannot be used. Since the foregoing LPS process requires knowledge of 3-D data in the work environment, its use as a general-purpose measurement device is limited to those cases where 3-D data is available.

Other processes for general-purpose measurement without use of known 3-D reference data may involve: simple measurement tools, such as tape measures, measuring wheels, GPS or differential GPS, laser trackers, and surveying equipment like theodolites and Total Stations. Some of these solutions can only measure point-to-point differences, and others can measure displacement vectors, but they are not configured to provide both position and orientation for objects that have been moved. Other tracking systems, such as optical motion capture, can measure both position and orientation of one or more objects as those objects move, but motion capture systems require setup of multiple cameras in the tracking environment, which increases complexity and cost, and reduces the portability of the system.

Other special-purpose devices may have some alignment capabilities, but they are not set up for general-purpose usage. For example, machine tools like Coordinate Measuring Machines (CMMs) have internal processes that perform similar tasks for alignment of the tool within the machine workspace.

It would be advantageous to provide a process that addresses LPS use cases for situations where known 3-D points are not available for calibration.

SUMMARY

The subject matter disclosed in detail hereinafter comprises systems and processes that address LPS use cases for situations where known 3-D points are not available for calibration. In its basic form, the process enables the determination of position and orientation data of objects relative to an arbitrary reference location. Additional variations of the process address cases where a LPS has been repositioned and where multiple objects are being tracked.

The measurement method disclosed herein allows for a wider range of uses for LPS and enables new types of applications involving relative location measurement. It can be used in applications such as robotic device localization and measurement system configuration. It can also be used for general-purpose point-to-point measurement applications. In particular, the measurement method disclosed herein enables rapid localization (position and orientation measurement) of large structures (such as an airplane fuselage or wing) relative to robotic arms on tracks that perform a non-destructive evaluation (NDE) scan of the structure after it has been fabricated. Some future factories will require a method of orientation that can be done quickly. The measurement method disclosed herein also enables precise and rapid re-positioning of tooling or sensors, such as microwave sensors for measuring paint thickness in between applications. In this case, it is important to be able to place the sensor back at the same measurement locations on the surface between coats.

The system and process in accordance with one embodiment solves the problem of determining the location (i.e., the position and orientation) of an object relative to a previous location of the object, or relative to another object, without the need for known 3-D data point positions in the environment. The system and process in accordance with another embodiment can be used to solve the problem of determining the location of the measurement instrument relative to a previous location of the measurement instrument using visible feature points on a target object as a reference, again without need for known 3-D data point positions. The system and process in accordance with a further embodiment is capable of determining the locations of multiple objects relative to each other.

Some of the main differences between the measurement method disclosed herein as compared to the method used internally by CMMs is that the measurement method disclosed herein is a portable application that can work with any type of moveable object in any size environment; it does not contact the target object; it can be integrated into other machine control systems; and can be manually operated or be part of an automated application.

The relative object location or measurement instrument location data determined by the process described herein can be transmitted to other downstream processes for alignment or measurement purposes, or can be presented through a computer user interface to guide an operator in accomplishing measurement-related tasks. It can be used in a manual operation mode or can use an image processing technique as part of an automated measurement system.

Although the measurement method disclosed herein does not give results in the local coordinate system of the target object (as in the LPS process that uses known position data), it can give the position and orientation of an object relative to a starting location, which in many cases may be sufficient for the required task. For example, in some situations a measurement process that had required absolute coordinate measurement may be reformulated into a process that can be performed with only relative offset information. If the measurement task can be defined in terms of position and orientation offsets from a reference location, such as visible landmarks, then the relative process presented here may be able to replace the absolute coordinate process (and known 3-D data point positions are not needed).

One aspect of the subject matter disclosed in detail below is a method for determining a current position of a target object relative to an initial location of the target object, where in this description "location" comprises a position and an orientation. This method comprises: (a) selecting a set of at least three non-collinear points on a target object; (b) placing the target object at an initial location within measurement range of a positioning system (with a non-occluded view of the target points); (c) measuring respective coordinates of three points of the set of points associated with the target object in a frame of reference of the positioning system while the target object is at the initial location; (d) moving the target object from the initial location to a current location; (e) measuring respective coordinates of the three points associated with the target object in the frame of reference of the positioning system while the target object is at the current location; and (f) computing a position difference in a frame of reference of the initial location of the target object based on results of steps (c) and (e), the position difference representing a difference between the initial and current positions of the target object in the frame of reference of the initial location of the target object. In accordance with some embodiments, step (f) further comprises computing an orientation difference in the frame of reference of the initial location of the target object based on the results of steps (c) and (e), the orientation difference representing a difference between the initial and current orientations of the target object in the frame of reference of the initial location of the target object. The method may further comprise displaying results of step (f) to a user or sending results of step (f) to an application. When the number of points selected in step (a) is greater than three, step (c) further comprises measuring coordinates of a fourth point, and the method further comprises: computing a second transformation matrix that defines the offset of the current location of the target object relative to the initial location of the target object; and multiplying the coordinates of the fourth point by the second transformation matrix.

Another aspect of the subject matter disclosed in detail below is a method for determining a position of one target object relative to another target object. This method comprises: (a) selecting a set of at least three points on a first target object; (b) placing the first target object at a first location within measurement range of a positioning system having a non-occluded view of the target points on the first target object; (c) measuring respective coordinates of three points of the set of points on the first target object in a frame of reference of the positioning system while the first target object is at the first location; (d) selecting a set of at least three points on a second target object; (e) placing the second target object at a second location within measurement range of a positioning system having a non-occluded view of the target points on the second target object; (f) measuring respective coordinates of the three points on the second target object in the frame of reference of the positioning system while the second target object is at the second location; and (g) computing a first location difference in a frame of reference of the first location of the first target object based on results of steps (c) and (f), the first location difference representing a difference between the respective locations of the first and second target objects in the frame of reference of the first location of the first target object. This method may further comprise: (h) moving one or both of the first and second target objects and/or the positioning system from the initial location to a current location, the current location comprising a current position and a current orientation; (i) after step (h), measuring respective coordinates of the three points on the first and second target objects in the frame of reference of the positioning system; (j) computing a second location difference in a frame of reference of the first location of the first target object based on results of step (i), the second location difference representing a difference between the respective locations of the first and second target objects in the frame of reference of the first location of the first target object; and (k) computing a third location difference in a frame of reference of the first location of the first target object, the third location difference being based on a difference between the first and second location differences. In accordance with one implementation, this method further comprises sending the results of step (k) to another process or application, such as a controller that controls the movement of one of the first and second target objects.

A further aspect is a method for locating a point on a target object comprising: (a) placing first instances of a positioning system and a target object at respective locations such that the first instance of a target object is within measurement range of the first instance of a positioning system; (b) selecting a set of at least three points on the first instance of a target object; (c) measuring respective coordinates of three points of the set of points on the first instance of a target object in a frame of reference of the first instance of a positioning system while the first instances of a positioning system and a target object are at their respective locations; (d) placing second instances of a positioning system and a target object at respective locations such that the second instance of a target object is within measurement range of the second instance of a positioning system; (e) measuring respective coordinates of three points of the set of points on the second instance of a target object in a frame of reference of the second instance of a positioning system while the second instances of a positioning system and a target object are at their respective locations; and (f) computing a displacement matrix that represents the change in the frame of reference of the second instance of a positioning system with respect to the frame of reference of the first instance of a positioning system based on differences between the measurement results of steps (c) and (e); and (g) computing an updated calibration matrix representing a transformation from the frame of reference of the second instance of the positioning system to a frame of reference of the second instance of the target object by multiplying a current calibration matrix by said displacement matrix.

Yet another aspect of the subject matter disclosed below is a method for re-calibrating a positioning system with respect to a target object, the method comprising: (a) selecting a set of at least three points on a target object; (b) obtaining measurement results comprising respective coordinates of the set of points measured in the frame of reference of a positioning system while the positioning system is at a first location; (c) setting up the positioning system at a second location different than the first location; (d) measuring respective coordinates of the three points of the set of points on the target object in the frame of reference of the positioning system while the positioning system is at the second location; (e) computing a displacement matrix based on differences between the obtained measurement results and the measurement results of step (d); and (f) computing an updated calibration matrix representing a transformation from the frame of reference of the positioning system at the second location to a frame of reference of the target object by multiplying a calibration matrix corresponding to the obtained measurement results by the displacement matrix.

The concepts disclosed and embodied herein are not limited to use with local positioning systems, and it may be capable of working with similar orientation+distance measurement systems.

Other aspects of systems and methods for performing relative object localization are disclosed below.

BRIEF DESCRIPTION OF THE DRAWINGS

Reference will hereinafter be made to the drawings in which similar elements in different drawings bear the same reference numerals.

DETAILED DESCRIPTION

The process for LPS usage described in detail herein is based on measurement of 3-D point positions relative to prior positions of the same pattern of points. The 3-D points are defined relative to an arbitrary reference location and the local object coordinates of these points do not need to be known prior to use of the method. The process uses the measured positions of a set of 3-D points in two or more locations to determine the relative position and orientation displacement of the set of points.

Some LPS users have had difficulty acquiring the required 3-D data to make the current LPS calibration process work, which limits the type of applications in which they could use LPS. Although multiple approaches to access 3-D data have been provided for objects in which 3-D information is known, this 3-D data acquisition step takes time and can be challenging in some situations. In some use cases 3-D data might not be available, and for other cases, the as-built or modified object may differ enough from the as-designed 3-D CAD model of the object that a correct calibration is not acquired, which may lead to measurement errors.

The LPS calibration capability disclosed herein enables use of LPS for specific types of measurement without requiring the input of known 3-D points. Although this method does not provide direct measurement of local coordinates on the target object, it does provide the ability to measure changes between points or between sets of points—enabling a large number of potential use cases. The ability to use LPS to measure change in position and orientation from a reference location is the core capability disclosed herein, and has led to several variations of the method in applications associated with object alignment. The primary variations that will be discussed include: a) computing offsets for a moved object with a stationary LPS (and equivalently a stationary object with a moved LPS), b) re-targeted points of interest with a moved object and/or a moved LPS, and c) computing offsets for multiple moved objects.

Method Details

The instrument calibration matrix is one of the foundation elements of the LPS process; it defines where the location of the LPS instrument is relative to the target object in terms of the reference coordinate system in which the calibration points are defined. This matrix is used in the calculation of the 3-D positions of additional measured points defined in the same reference frame as the calibration points. But in order for the calibration matrix to represent a specific coordinate system associated with the target object, the coordinates in calibration points (defined in that reference frame) need to be known. If those points are not known, which is often the case, then the required calibration matrix is also unknown. The process described herein seeks to solve for the difference in location (i.e., position and orientation) of a set of points, and with this process the initial calibration matrix that is used is irrelevant—as long as it is a valid 4×4 homogeneous transformation matrix and the reference frame is known. For this method, a default setting for the matrix (e.g., an identity matrix) is used during the initial measurement of the target point positions. This results in the measured points being defined in terms of the LPS instrument reference frame. Next, the points are transformed into the reference frame of the initial location of the set of points, after which the difference to the next location is computed.

The process described here can be used to determine: (1) the location offset (hereinafter the terms "location offset" and "location difference" will be used interchangeably as synonyms) for moved sets of points or equivalently the displacement of the LPS instrument if it has moved relative to the points; (2) returning to the same set of points if either the points or the LPS has moved (or both at the same time);

and (3) measuring the location offset between multiple sets of moved points. The details of each of these variations will be discussed next.

Figure 1:
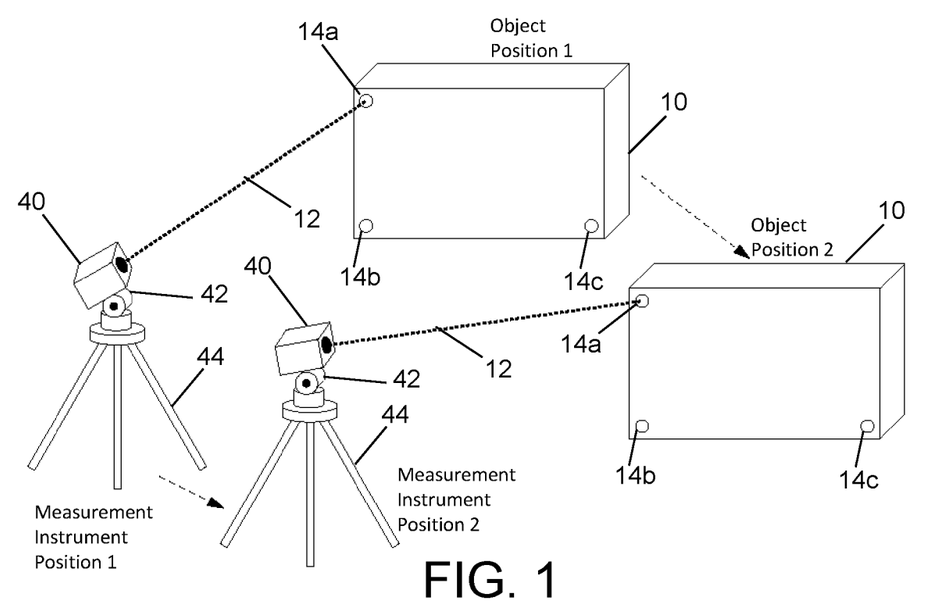
FIG. 1 is a diagram showing an isometric view of a physical setup in which a local positioning system is aimed at a target object for using a basic difference measurement method in accordance with one embodiment.

Process for Measuring the Location Offset when a Set of Points or the LPS has Moved:

FIG. 1 shows a physical setup in which an LPS is aimed at a target object 10 for using a basic difference measurement method in accordance with one embodiment. The LPS comprises a single video camera 40 and a laser range meter (not shown) on a controllable pan-tilt mechanism 42 with angle measurement capability mounted on a tripod 44. The video camera 40 may have automated (remotely controlled) zoom capabilities. The video camera 40 may additionally include an integral crosshair generator to facilitate precise locating of a point within an optical image field display of the video camera. The video camera 40 and pan-tilt mechanism 42 may be operated by a computer (not shown in FIG. 1, but see LPS computer 48 in FIG. 6). The computer communicates with the video camera 40 and the pan-tilt mechanism 42 through a video/control cable. Alternatively, the computer may communicate with video camera 40 and pan-tilt mechanism 42 through a wireless communication pathway. The pan and tilt angles of the pan-tilt mechanism 42 and, therefore, the orientation of the video camera 40 can be controlled using the keyboard of the computer or other input device. The optical image field, with crosshair overlay, as sighted by the video camera 40, can be displayed on the monitor of the computer.

The pan-tilt mechanism 42 is controlled to positionally adjust the video camera 40 to selected angles around a vertical, azimuth (pan) axis and a horizontal, elevation (tilt) axis. A direction vector 12, that describes the orientation of the camera relative to the fixed coordinate system of the tripod 44 (or other platform on which the pan-tilt unit is attached), is determined from the pan and tilt angles, as well as the position of the center of crosshair marker in the optical field when the camera is aimed at a point of interest. This direction vector 12 can be depicted as a line extending from the lens of the camera 40 and intersecting a location on the target object 10.

A laser range meter may be incorporated inside the housing of camera 40 or mounted to the outside of camera 40 in such a way that it transmits a laser beam along the direction vector 12. The laser range meter is configured to measure distances to the target object 10. The laser range meter may have a laser and a unit configured to compute distances based on the laser light detected in response to a laser beam reflected by the target object 10.

The local positioning system shown in FIG. 1 further comprises three-dimensional localization software which is loaded into the computer (not shown). For example, the three-dimensional localization software may be of a type that uses multiple non-collinear calibration points 14a-14c on the target object 10 to define the location (position and orientation) of video camera 40 relative to the target object 10. Typically calibration points are selected which correspond to features that can be easily located on the target object 10.

The measured distances to the calibration points 14a-14c may be used in coordination with the pan and tilt angles from the pan-tilt mechanism 42 to solve for the camera position and orientation relative to the target object 10. A method for generating an instrument to target calibration transformation matrix (sometimes referred to as the camera pose) is disclosed in U.S. Pat. No. 7,859,655. Using the measured data, the calibration process computes the 4×4 homogeneous transformation matrix that defines the position and orientation of the video camera 40 (and laser range meter) relative to the target object 10.

Once the position and orientation of the video camera 40 with respect to the target object 30 have been determined and a camera pose transformation matrix has been generated, camera pan data (angle of rotation of the video camera 40 about the azimuth axis) and tilt data (angle of rotation of the video camera 40 about the elevation axis) may be used in conjunction with the calculated position and orientation of the video camera 40 to determine the X, Y and Z coordinates of any point of interest on the target object 30 in the coordinate system of the initial location of the target object 10.

In accordance with the setup shown in FIG. 1, either the target object 10 can be moved from Object Position 1 to Object Position 2 while the LPS is stationary, or the LPS can be moved from Measurement Instrument Position 1 to Measurement Instrument Position 2 while the target object 10 is stationary. In either case, relative location data (position and orientation) can be acquired.

Figure 2:
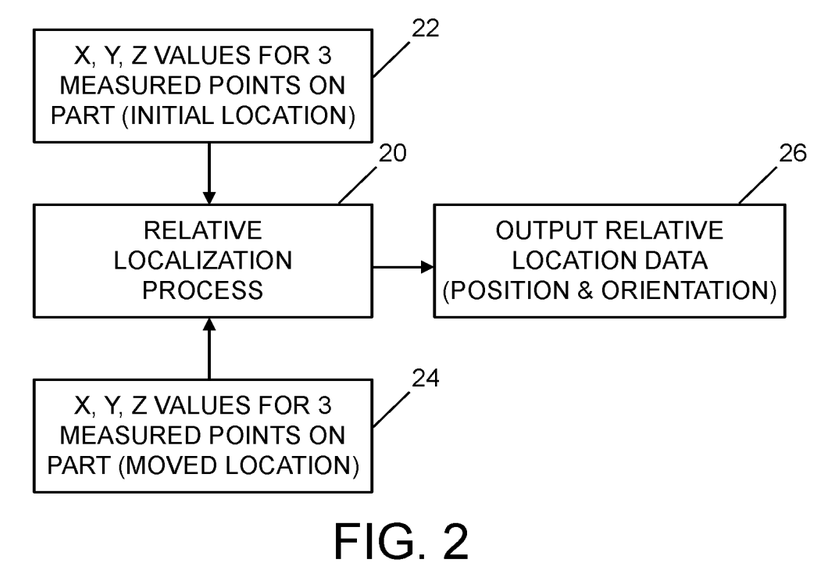
FIG. 2 is a flowchart showing data acquisition and processing steps for a basic location difference measurement method.

FIG. 2 shows steps of a method in accordance with one embodiment for measuring the location offset or difference when either the target object 10 or the LPS is moved. First, the system determines the X, Y, Z values for the three measured points 14a-14c when the target object 10 and the LPS are at their initial locations (step 22). Then the system determines the X, Y, Z values for the three measured points 14a-14c after either the target object 10 or the LPS has been moved to a new location (step 24). These values are input into a relative localization process 20 which processes the X, Y, Z values for the initial and moved locations and then outputs relative location data (step 26).

Figure 3:
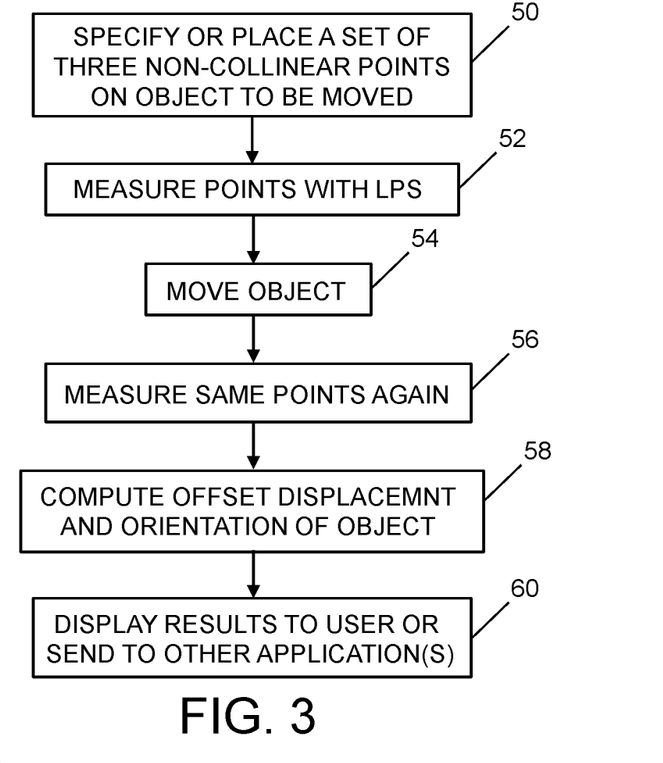
FIG. 3 is a flowchart showing steps of a process for measuring location offset when a set of three non-collinear points has moved.

FIG. 3 is a flowchart showing steps of a process in accordance with one embodiment for measuring the location difference when the target object 10 is moved. (A similar process applies when the LPS instrument, not the target object is moved.) First, a set of three non-collinear points on the target object 10 is specified or a set of markers are attached to the target object 10 at a set of three non-collinear points (step 50). Then the coordinates (i.e., the X, Y, Z values) of the three non-collinear points are measured using the LPS instrument (step 52). The measurement results (i.e., the location measurement data) are stored in memory that is accessible to the LPS computer (not shown in FIG. 1). Following this first set of measurements, the target object 10 is moved (step 54). Then the coordinates of the same points are measured again using the LPS instrument (step 56). Again the measurement results are stored in memory. Thereafter the offset position and orientation of the target object 10 (this will be discussed in detail later) are computed (step 58) by the LPS computer, which retrieves and processes the stored measurement data. The results are displayed to the user or sent to other application(s) (step 60).

Some use cases for this process include setting the position and orientation offset for a workpiece in a manufacturing workcell or inspection application. An example of the use of this process could be for object-to-robot alignment in a robotic workcell, where large parts or a robot are moved relative to each other before starting an assembly or inspection task. In one such application the robot may be programmed to move its end effector along a specific path relative to the workpiece (target object) in the workcell. But the location of the workpiece relative to the robot may be variable, and subsequent workpieces of the same type may not be in the same location as the initial workpiece that was used during initial programming of the robot. In this situation, if the difference between the location of the current workpiece and the location of the initial workpiece were known, the offset could be sent to the robot and used as a base or origin location offset in the robot control program. The process described above with reference to FIG. 3 can be used to address this type of application.

The steps shown in FIG. 3 were described in terms of a moved set of points, but the method also works for the case where the LPS instrument has moved and the location displacement of the instrument is required. Note that if both the set of points and the LPS instrument have moved at the same time, then the reference frame displacements of the points relative to the starting location of the points and the displacement of the LPS instrument relative to its starting location cannot be determined with this version of the method. Either one or the other must have a common frame of reference with its initial location in order for this variation of the method to work. For the case when both have moved, then the multiple moving objects process (described later) may be used.

The details of how the set of points are used in the location displacement algorithm will be discussed next with reference to the vector diagram of FIG. 4.

The position and orientation offset determination process starts with specifying or placing a set of three non-collinear points on the target object to be measured by LPS. In one embodiment of the reference frame definition process, one of the points in the set of points may be defined as the origin, another specified as one of the coordinate axes (such as the x-axis), and the third point may be used in specifying the direction of one of the orthogonal axes (such as the z-axis) using a vector cross product calculation. A third axis that is orthogonal to the other two will be determined using another vector cross product step. These steps are shown in Eqs. (1) below:

$$\bar{v}_1 = \bar{p}_1 - \bar{p}_0 \quad (1)$$
$$\bar{v}_2 = \bar{p}_2 - \bar{p}_0$$
$$\hat{v}_x = \frac{\bar{v}_1}{\|\bar{v}_1\|}$$
$$\bar{v}_y = \bar{v}_2 \times \bar{v}_1$$
$$\hat{v}_y = \frac{\bar{v}_y}{\|\bar{v}_y\|}$$
$$\hat{v}_z = \hat{v}_x \times \hat{v}_y$$

Figure 4:
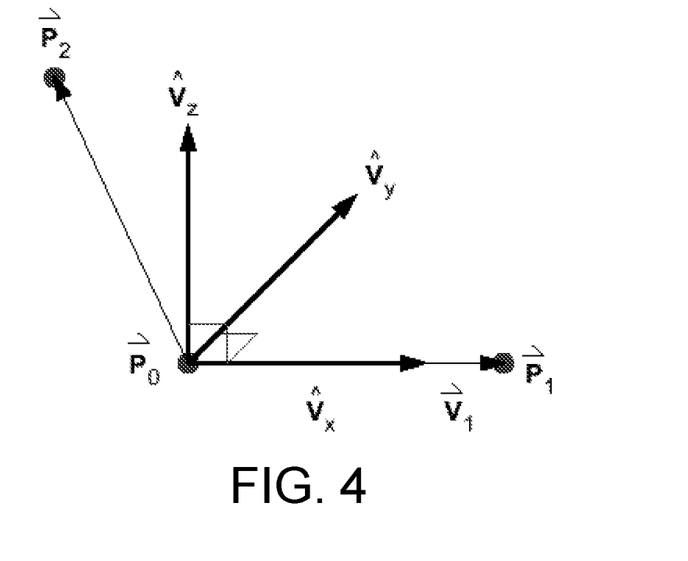
FIG. 4 is a vector diagram for reference frame computation.

The process begins by defining vectors $\bar{v}_1$ and $\bar{v}_2$ using the three measured points $\bar{p}_0$, $\bar{p}_1$ and $\bar{p}_2$ from the initial measured location, then computing the orthogonal unit vectors $\hat{v}_x$, $\bar{v}_y$ and $\bar{v}_z$ (see FIG. 4). These three orthogonal unit vectors will be used to create columns of a 3×3 rotational matrix (also known as a direction cosine matrix) as shown below:

$$Rot = \begin{bmatrix} \hat{v}_{x1} & \hat{v}_{y1} & \hat{v}_{z1} \\ \hat{v}_{x2} & \hat{v}_{y2} & \hat{v}_{z2} \\ \hat{v}_{x3} & \hat{v}_{y3} & \hat{v}_{z3} \end{bmatrix} \quad (2)$$

The changes in position (ΔX, ΔY and ΔZ) for the origin point are included as the last column, with 0, 0, 0, 1 as the last row, resulting in a 4×4 homogeneous transformation matrix, shown below:

$$_0^1 T = \begin{bmatrix} r_{11} & r_{12} & r_{13} & \Delta X \\ r_{21} & r_{22} & r_{23} & \Delta Y \\ r_{31} & r_{32} & r_{33} & \Delta Z \\ 0 & 0 & 0 & 1 \end{bmatrix} \quad (3)$$

where $r_{11}$ through $r_{33}$ are the elements of the 3×3 rotation matrix shown in Eq. (2). The 4×4 matrix of Eq. (3) defines the initial state of the set of points (reference frame {1}) relative to the internal coordinate system of the LPS instrument (reference frame {0}).

Initially both sets of measured points are defined relative to the arbitrary reference frame {0}, which was set as the origin of the LPS instrument, but in order to compute the position and orientation offsets relative to the first set of points (i.e., reference frame {1}), the measured points will be pre-multiplied by the 4×4 matrix described in Eq. (3), as shown below:

$$^1P_{i,j} = {}_0^1T \, ^0P_{i,j} \quad (4)$$

where the subscripts i, j represent the individual points in each set of points.

With the two sets of vectors defined in terms of the coordinate system of the first set of points, the differences in position and orientation between the two sets of points (one set having a local coordinate system A and the other set having a local coordinate system B) can be computed. This difference calculation is performed with a simple element-by-element subtraction for the initial location (a) and subsequent locations (b, c, etc.), for example: $\Delta P_{i,j} = {}^bP_{i,j} - {}^aP_{i,j}$.

For situations where the reference points are not aligned along specific axes, the process for aligning vectors described in U.S. Pat. No. 7,859,655 may be used. In this situation, since there is no pre-defined reference coordinate system for the object, the method uses the instrument coordinate system as the frame of reference.

Start defining two vectors for each set of points (vector indications removed for clarity):

$$V_{A12} = P_{A2} - P_{A1}$$
$$V_{A13} = P_{A3} - P_{A1}$$
$$V_{B12} = P_{B2} - P_{B1}$$
$$V_{B13} = P_{B3} - P_{B1} \quad (5)$$

Then compute the transformation matrix describing the rotation from one set of vectors to the other:

$$n_A = V_{A12} \times V_{A13}$$
$$n_B = V_{B12} \times V_{B13}$$
$$axis_1 = n_A \times n_B$$
$$ang_1 = \arccos(|n_A| \cdot |n_B|)$$
$$Rot_1 = f_1(ang_1, axis_1)$$
$$axis_2 = V_{A12} \times V_{B12}$$
$$ang_2 = \arccos(|V_{A12}| \cdot |V_{B12}|)$$
$$Rot_2 = f_1(ang_2, axis_2)$$
$$Rot_{12} = Rot_1 * Rot_2$$
$$^B_A T = [Rot_{12}, Rot_1 * V_{B12} - V_{A12}]$$
$$^A_B T = (^B_A T)^{-1}$$

where $f_1(\ )$ is the function which generates a 3×3 rotation matrix from the angle-axis definition (described in detail by Craig, J. J., in "Introduction to Robotics: Mechanics and Control", Addison-Wesley, 1986). Note that $^B_A T$ only needs to be computed once for any position of the measurement device relative to the target object, and can then be used to convert any number of vectors from coordinate system A into coordinate system B.

The result of the foregoing calculations is an angle-axis representation that is converted into a 4×4 homogeneous transformation matrix that describes the position and orientation offsets of the set of points at the second location relative to the set of points at the first location, and defined in the coordinate system of the first location of the set of points.

To finish the process, the origin offset values ($\Delta X_{AB}$, $\Delta Y_{AB}$ and $\Delta Z_{AB}$) are included as the last column, in the same way as shown in Eq. (3). The resulting 4×4 homogeneous transformation matrix describes the offset of the second location relative to the first location in terms of the coordinate system of the first location.

Multiple locations of the object relative to its initial position can be handled with repeated usage of the same process outlined above. And the same type of solution is also applicable to the situation were the LPS instrument is moved. Moving a set of points from one location to another or moving the measurement instrument is equivalent from the computational aspect of the process, but the use case and implementations may be different. The details of a variation of this process for re-targeting a sequence of points of interest will be discussed next.

Recalibration of LPS to Re-Target a Set of Points when the LPS Instrument and/or the Set of Points have Moved:

The relative displacement measurement process described above was explained in terms of a moving set of points from one location to another or equivalently, moving the LPS instrument. An extension of this process for visual indication of multiple points on a target object is to instruct the LPS instrument to aim (i.e., point its laser and camera) at the same set of points that were recorded in a prior session after the set of points, the LPS instrument, or both have been moved. This is useful in cases when a user records 3-D measurements of a set of points on a target object—which would include the three calibration points, as well and any other points of interest—and then wishes to return to them (i.e., aim the LPS laser at the points) at a future time when the placement of the LPS instrument relative to the target object may have changed. For this type of re-targeting use case, the displacement matrix is computed and will be used to pre-multiply the existing LPS calibration matrix, as shown in Eq. (7):

$$M_{new\_cal} = M_{diff} M_{old\_cal} \quad (7)$$

In Eq. (7), $M_{old\_cal}$ may be a 4×4 homogeneous transformation matrix (computed using the standard three-point LPS calibration process disclosed in U.S. Pat. No. 7,859,655) that describes the position and orientation of the coordinate system of a target object relative to the LPS instrument. In other situations, $M_{old\_cal}$ may be an arbitrary 4×4 homogeneous transformation matrix, such as the identity matrix associated with the relative location method described earlier. When the user moves the LPS, or equivalently when the target object moves, or if both LPS and the target have moved, the goal is to compute a new calibration matrix $M_{new\_cal}$ based on the relative position and orientation of the LPS and the target object. The displacement matrix $M_{diff}$ in Eq. (7) describes this relative position and orientation difference and is computed using the process described in Eqs. (5) and (6). $M_{diff}$ is used to modify the original LPS calibration matrix $M_{old\_cal}$ in order to create a new calibration matrix $M_{new\_cal}$. The resulting matrix can then be used as the new LPS calibration matrix. After this recalibration step, the user will be able to instruct LPS to aim at the list of points regardless of where the LPS instrument has moved to (as long as the aim path is not occluded).

In this process the operator will select three visible features or place three markers on the target object as calibration points (which should be non-collinear and spaced as far apart as practical), and then measure other points of interest on the target object in its first position. The goal will be to return to all of the same points after the LPS instrument has been moved to a different location. In this usage scenario, the three calibration points should be easy to locate visually, but the rest of the points of interest do not have to be. For example, the three calibration points may be corners of an airplane window, and the other points of interest may be points, such as rivet locations, that may be painted over and not visible at a later time.

Figure 5:
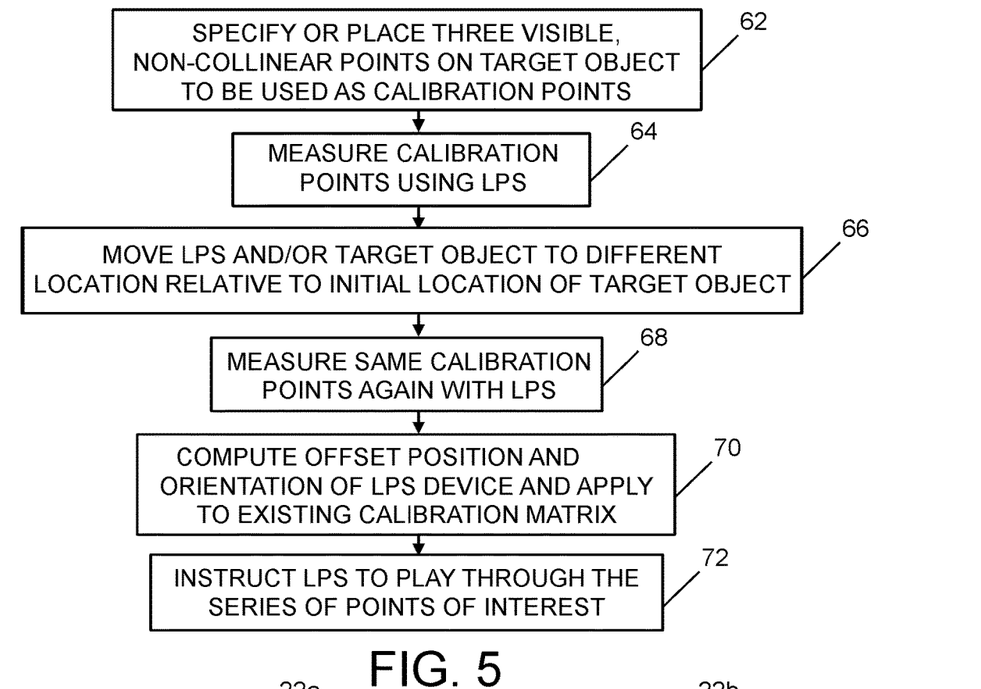
FIG. 5 is a flowchart showing steps of a process for recalibrating an LPS to re-target a set of points after the LPS instrument has been moved.

The individual steps for the points of interest re-targeting process are shown in FIG. 5. First, the operator specifies or places three visible, non-collinear points on the target object to be used as calibration points (step 62). The operator may specify one or more additional points of interest on the target object. The coordinates of those calibration points and any points of interest are then measured using the LPS instrument (step 64). The measurement results are stored in memory. Thereafter the LPS instrument is moved to a different location relative to the target object (step 66). Then the coordinates of the same calibration points on the target object are measured again using the LPS instrument (step 68). The measurement results are again stored in memory The LPS computer then computes the offset position and orientation of the LPS device, and applies the resulting transformation matrix (i.e., $M_{diff}$ in Eq. (7)) to the existing calibration matrix (i.e., $M_{old\_calc}$ in Eq. (7)) (step 70 in FIG. 5). The LPS is then instructed to play through the series of points of interest (which involves the LPS automatically aiming at each of the points of interest defined in step 62).

Note that the "existing calibration matrix" may be the identity matrix, but in some cases it will not be. For example, the original calibration matrix may have been created using some other method (like the original LPS method disclosed in U.S. Pat. No. 7,859,655) or for the relative motion usage case, the current location of the object may not be the second location, but rather the third or fourth, etc., in which case the existing calibration matrix may have been the result of multiplying prior differences matrices. So while the calibration matrix may have started as an identity matrix, it may have been modified prior to the latest location change, in which case the "existing calibration matrix" may currently be something other than an identity matrix.

The foregoing process may also be used in situations where two similar target objects are at different sites A and B. An operator at site A targets three visible calibration points and any number of other points of interest on the target object at site A, and then saves all of the points in a file. The operator at site A then sends the point file to an operator at site B and instructs the operator at site B to measure instances of the same three visible features on the target object at site B. The operator at site B instructs the LPS instrument at site B to recalibrate using this data (i.e., the points data from site A and site B).

When the LPS re-calibration process is used by the operator at site B, the data at site B will be produced by that site's LPS instrument in the coordinate system used by the LPS measurements made at site A. For example, if the measurements at site A were in target object coordinates, then the site B results will be in target object coordinates. Alternatively, if the operator at site A used the internal reference coordinate system of the LPS instrument, then the LPS instrument at site B will be re-calibrated to the frame of reference of the LPS instrument at site A. The LPS re-calibration process at site B uses the LPS calibration matrix from site A and produces a difference matrix describing the location of the LPS instrument at site B relative to the target object-to-LPS location at site A.

The LPS calibration matrix is derived from a set of Cartesian and spherical coordinate points, so optionally, if the operator at site A sent both types of point files to site B, then the LPS software at site B can re-compute the original calibration matrix, but it is also possible to send the original calibration matrix directly, along with the Cartesian point file.

Upon completion of the LPS re-calibration process at site B, the operator at site B may then instruct the LPS instrument at site B to play through the points of interest sent by the operator at site A. The LPS instrument at site B will then aim its laser at the same points measured by the operator at site A, even though the LPS instrument at site B is in a different location relative to the target object at site B. This data sharing and calibration process effectively synchronizes the respective LPS instruments at sites A and B.

Optionally, the operator at site B may want to send additional points back to the operator at site A, which by following the same process, would synchronize the LPS instrument at site A with the LPS instrument at site B. The transfer of the point data files between the two sites could happen in real-time (such as with a socket interface over a network connection), or delayed in time, such as would happen with e-mail or sending a copy of the data, which could be on physical media (like a compact disk).

This process enables the transfer of calibration from one LPS instrument to another. It could be useful in communicating the locations of points of interest between two or more operators working on similar target objects. In accordance with this remote usage concept, two (or more) separate LPS instruments will be sharing a set of data points, even though the LPS instruments will be in different locations with respect to their respective target objects.

There are multiple ways that this concept can be implemented, including having the calibration points targeted in a separate step or making the calibration points part of the same dataset that contains all of the points of interest (such as using the first three points or the last three points in the sequence). In one implementation of this concept, all of the points are stored in the same file.

The synchronization process described above has some similarities with the remote operation of an LPS that is described in U.S. Pat. No. 8,447,805 and U.S. Patent Application Pub. No. 2012/0327187, but the process described here is much simpler to implement and use, since it does not require either known 3-D data points or a real-time data connection, and it provides an easy-to-use process that addresses distance separation as well as tasks that are separated in time (by seconds, days, or even years).

Process for Measuring Location Offsets for Multiple Moving Objects:

The method for determining location displacement disclosed above also enables the determination of the position and orientation of one target object relative to another using only a single, portable measurement device and visible reference features on the target objects.

Up to this point, the discussion of the method for determining location displacement has involved one object (with a set of three visible, non-collinear features) and an LPS instrument, but the range of usage scenarios can be extended to address multiple moved objects through the use of multiple applications of the method. This approach will enable additional types of relative displacement use cases in situations with two or more moved objects (each with its own set of visible reference points arranged in the same configuration).

Figure 6:
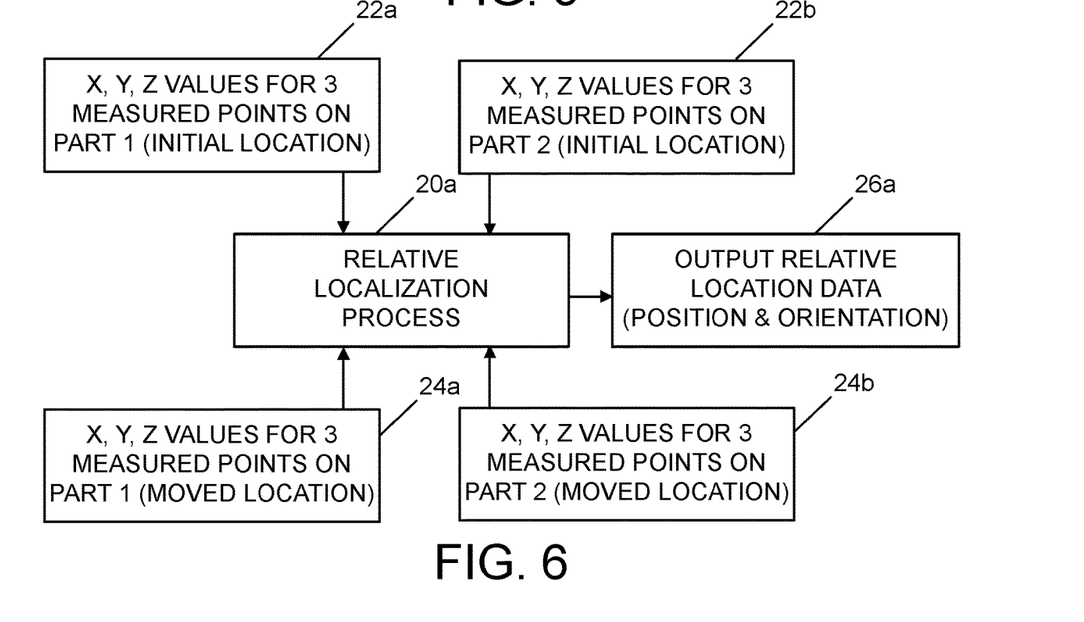
FIG. 6 is a flowchart showing data acquisition and processing steps in a method of measuring location offset for multiple moving objects.

FIG. 6 shows steps of a method in accordance with one embodiment for measuring the location offset between two workpieces (e.g., Part 1 and Part 2) when either or both parts have moved relative to an LPS instrument. First, the system determines the X, Y, Z values for three measured points on Part 1 and the X, Y, Z values for three measured points on Part 2 when these parts are at their respective initial locations (steps 22a and 22b). The three measured points on Parts 1 and 2 may be arranged in the same or different configurations, so long as the three reference points in each set are not collinear. After Parts 1 and 2 are moved to new locations, again the system determines the X, Y, Z values for the same measured points on Parts 1 and 2 (steps 22a and 22b). All of these values are input into a relative localization process 20a which processes the X, Y, Z values for the respective initial and moved locations of Parts 1 and 2, and then outputs relative location data (step 26a).

The foregoing variation of the method for determining location displacement can be used to compute the location change of one or more objects from a reference object, even if the location of the LPS instrument has changed. This capability can be used to address situations where two or more independent objects may move relative to each other, and where one or more of them may have moved relative to the location of a respective LPS instrument. Since this form of the method is addressing relative displacement between the two (or more) objects, the process is independent of LPS instrument location change.

And if it is known that the location of the LPS instrument has not changed, or if the location offset of the LPS instrument from its initial location is known, then the location of all of the moved objects relative to the reference object in its initial location can be determined.

It has already been discussed that the location of the LPS instrument relative to a stationary object can be determined; and in the scenario wherein two objects have moved, the LPS instrument has moved, and one stationary object is available, the relative displacement of the moved objects can be determined with respect to the location of one of the objects in its initial position.

An example of this type of use case is a robotic workcell where the displacement of the robot relative to a workpiece is required, but the workpiece, the robot, and the LPS instrument may have all been moved from prior locations when the robot was initially programmed. For example, the techniques disclosed above can be used to determine the position and orientation of a robotic arm relative to a workpiece (hereinafter "part") in such a situation.

Figure 7:
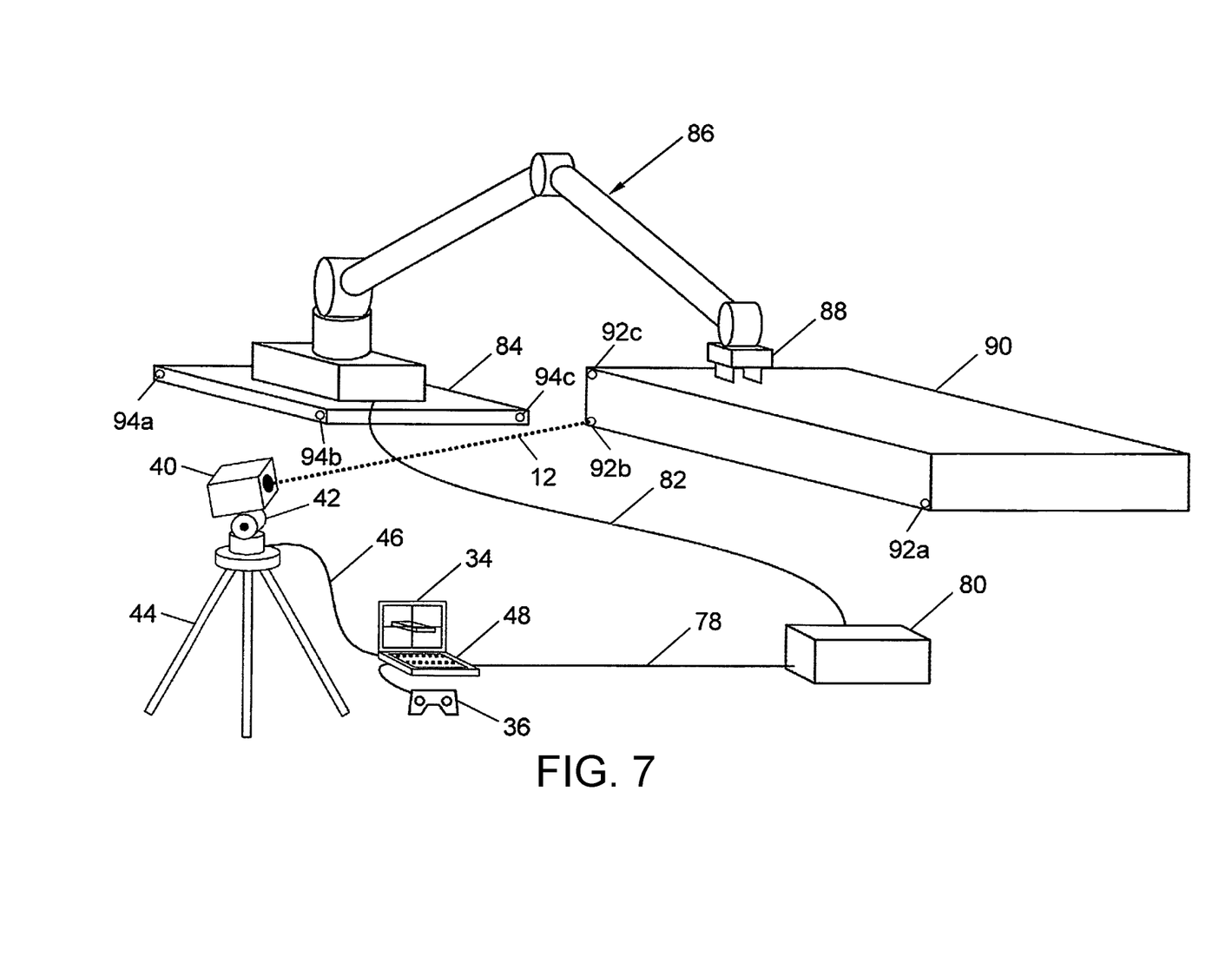
FIG. 7 is a diagram showing an isometric view of a physical setup in which a local positioning system is aimed at a robotic workcell with multiple moving objects in accordance with another embodiment.

As shown in FIG. 7, the LPS in accordance with one embodiment comprises a video camera 40 and a laser range meter (not shown) on a controllable pan-tilt mechanism 42 mounted on a tripod 44. The video camera 40 and pan-tilt mechanism 42 are operated by an LPS computer 48. The LPS computer 48 communicates with the video camera 40, laser range meter, and the pan-tilt mechanism 42 through a video/control cable 46. The pan and tilt angles of the pan-tilt mechanism 42 and, therefore, the orientation of the video camera 40 can be controlled using the keyboard of the computer or some other input device, such as the gamepad interface 36 shown in FIG. 7. The optical image field, with crosshair overlay, as sighted by the video camera 40, can be displayed on the monitor 34 of the computer 48.

The LPS seen in FIG. 7 can be used to determine the relative offset between a part 90 and the base 84 of a robotic arm 86 that may carry an end effector 88 on a distal end thereof. The robot controller 80 controls the robotic arm 86 and operates the end effector 88 for performing machining or other operations on the part 90. The LPS computer 48 communicates with the robot controller 80 through a cable 78. The robot controller 80 is preferably a computer programmed with motion control software whereby the location of end effector 88 can be controlled as a function of object location data output by the LPS computer 48.

The location offset between base 84 and part 90 can be determined in the manner previously described with reference to FIG. 6. First, the LPS computer 48 determines the X, Y, Z values for measured points 92a-92c on part 90 and the X, Y, Z values for measured points 94a-94c on base 84 when base 84 and part 90 are at their respective initial locations. After base 84 and part 90 have moved to new locations, again LPS is used to determine the X, Y, Z values for measured points 92a-92c and 94a-94c. The LPS system 48 the uses a relative localization process to produce data representing the location of the part 90 relative to the base 84 at their new locations. This data is output to the robot controller 80 via cable 78.

The foregoing methodology can be used at the start of each work sequence to establish the relative positions of the base 84 of the robotic arm 86 and the part 90. The robot controller 80 will be able to compute the position and orientation of the end effector 88 relative to the robot base 84 (using other sensors and kinematics data).

Commercial robotics applications used for production tasks have a process to define the location of the robot and other parts relative to the origin of the workcell. This will include both position and orientation offset definitions. There are many equivalent ways to define this offset information, such as: 4×4 transformation matrices, quaternions and translation, angle-axis and translation, or Euler angles and translation. The localization process described herein can be modified to output in whatever format is acceptable to the robot controller 80.

There are several options that may be used to transfer the data from the computer 48 to the robot controller 80; some controllers may have an application programming interface (API) that accepts incoming data over a network socket or through a serial interface; other controllers may only allow offset data to be read from a file. Accordingly, in accordance with some embodiments, a file sharing approach can be used.

Figure 8:
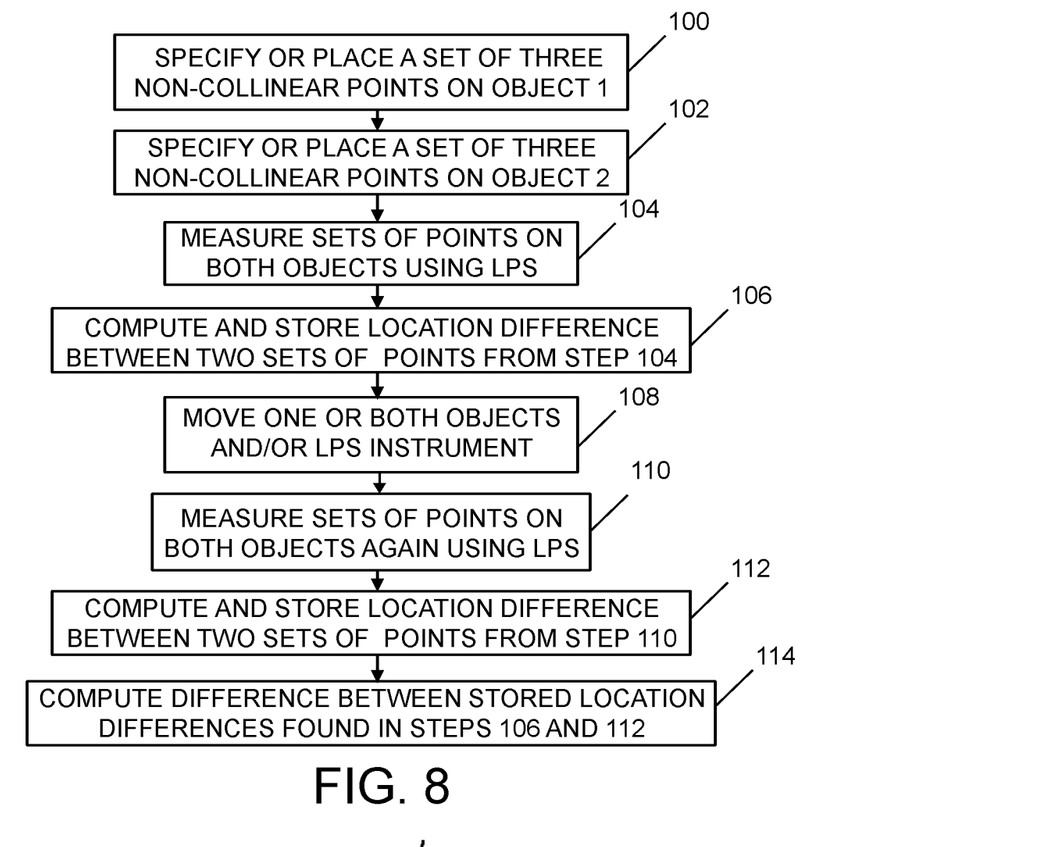
FIG. 8 is a flowchart showing steps of a process for measuring location offset for multiple moving objects.

The steps of a method of measuring the location offset or difference between two moving objects (such as the base 84 and the part 90 depicted in FIG. 7) are outlined in FIG. 8. First, a set of three non-collinear points on a first target object (Object 1 in FIG. 8) is specified or a set of markers are attached to the first target object at a set of three non-collinear points (step 100); and then a set of three non-collinear points on a second target object (Object 2 in FIG. 8) is specified or a set of markers are attached to the second target object at a set of three non-collinear points (step 102). Then the coordinates of the three non-collinear points on both objects are measured using the LPS instrument (step 104). (The respective frames of reference of the LPS instrument and the first and second target objects are indicated by {0}, {1}, and {2} in FIG. 9.) The measurement results are stored in memory. The LPS computer then computes the location difference between the two sets of points (step 106) based on the measurement results in step 104, defined in the reference frame of one of the objects (as described above), and stores this location difference in memory (e.g., as a 4×4 transformation matrix). (As used herein, the phrases "location difference" and "offset position and orientation" are synonymous.)

Figure 9:
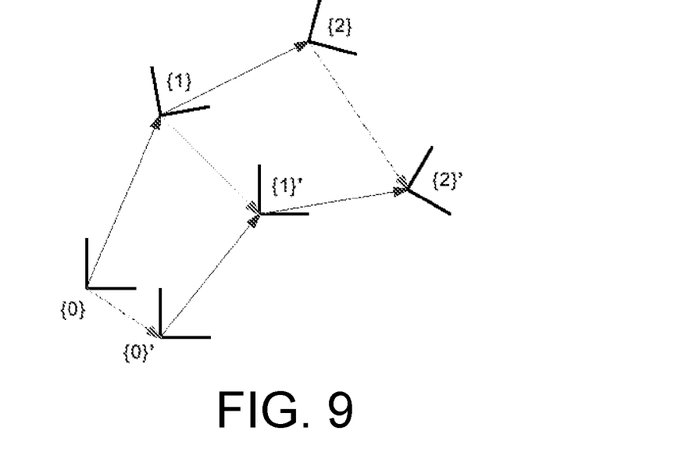
FIG. 9 is a diagram showing example reference frame configurations for multiple moving objects.

Following this first set of measurements, one or both of the objects and/or the LPS instrument can be moved (step 108). FIG. 9 depicts a situation wherein all three have been moved, the LPS instrument moving from reference frame {0} to reference frame {0}', Object 1 moving from reference frame {1} to reference frame {1}', and Object 2 moving from reference frame {2} to reference frame {2}'.

After the objects and LPS are moved, the coordinates of the same points on Objects 1 and 2 are measured again with respect to frames of reference {1}' and {2}' using the LPS instrument (see step 110 in FIG. 8). Again the measurement results are stored in memory. The LPS computer then computes the location difference between the two new sets of points (step 112) based on the measurement results in step 110 (defined in the reference frame of the same object that was selected in step 106), and stores this location difference in memory (e.g., as another 4×4 transformation matrix). Then the LPS computer computes the difference between the stored location differences found in steps 106 and 112.

Additional objects may also be included in the foregoing process, if necessary.

In the robotic workcell example described above with reference to FIG. 7, the location differences found in step 114 above would be used by the robot controller to determine its new base offset value of the robot relative to the workpiece. In this situation, the LPS instrument would be represented by reference frame {1} and {1}', the robot by reference frame {2} and {2}', and the workpiece by reference frame {3} and {3}' (as shown in FIG. 9). To determine the required change for the robot base offset value, it is important to note reference frames {2} and {2)}' can be considered to be coincident. This allows the calculated difference between workpiece locations {3} and {3}' to be applied to the robot base offset in the current location of the robot {2}'.

In another embodiment of this variation of a process with multiple applications of the difference method, if the absolute offset is required for a moved object when the LPS instrument has also been moved, an additional set of reference points can be attached to a stationary object. This stationary object would take the place of the frame of reference of the object selected in step 106.

The position and orientation differences between multiple separate objects can also be determined if those objects have a visible feature that can serve as a direction reference.

Modifying Existing LPS Applications to Use the Capability Disclosed Herein:

The LPS use case described in U.S. Pat. No. 7,859,655 requires calibration with respect to a specific coordinate system associated with the target object, but not all applications need to have measurements in absolute coordinates. Some types of use cases developed for the LPS that are currently based on knowing local calibration coordinates on the target object can be modified for use with the method disclosed herein if the application can be based on displacement relative to a starting point. For example, in the application to track the position and orientation of a crawler vehicle described in U.S. patent application Ser. No. 13/921,246, the LPS was calibrated to the coordinate system of the target object and instructed to measure the position and orientation of the robotic crawler as it moved to different inspection locations on the target object. That process works well if calibration coordinates are known, but in some cases 3-D point data is not available, such as for older airplanes designed without the use of CAD models. For these cases, operators would still like to be able to use the LPS for measurement tasks.

The relative measurement method disclosed herein cannot be used to indicate a location on the target object defined in the coordinate system of the target object, as would be required to direct a crawler vehicle to a specific starting point. But if the crawler vehicle could be moved to a desired starting location separately, the relative localization method described here can be used to track the crawler vehicle relative to its starting location. This modified localization method cannot completely replace the original LPS usage, but in some cases the problem can be reformulated to allow it to be solved as a relative displacement problem.

Point-to-Point Measurement:

Some simple measurement tools, like tape measures or measurement wheels, require an unobstructed path between measurement points. These types of devices also require contact with the surface of the target object. Other measurement devices such as surveying equipment hand-held laser range meters may have software to compute distances, but they do not have object orientation measurement capabilities.

The methodology disclosed herein measures object locations in terms of position and orientation, but can also handle simple position-only measurements. It can be used to compute translation and orientation displacement, can handle situations with obstructions between the measurement points, and does not require contact with the target object. These types of use cases are problematic for measurements with tape measures or measuring wheels.

This simple point-to-point measurement mode addresses distance between points, as well as vector-based measurement. For example, a user may have a requirement to "start here and mark a spot 200 inches in that direction, turn 90 degrees and mark another spot 100 inches from there, etc." The point-to-point process can also be used to measure perimeters or indicate positions on the surface of a target object using the LPS laser without contacting the surface.

Other Uses:

Post-Measurement Alignment:

Having measurements defined in the coordinate system of the target object is still going to be important for some applications, but in some situations it may not be necessary to know what the target coordinates are for the measured points while the points are being measured. For these situations the data points acquired with LPS in the relative measurement mode can be aligned with known 3-D data points (such as CAD model data) at a later time if that data becomes available. This allows the LPS operator to use LPS in the simpler relative position acquisition mode, with the operator taking pictures of the feature points (or indicating them in another way) to use in the future for 3-D model alignment. Then at a later time an analyst can align the feature points with 3-D model data of the target object and then convert all of the acquired data points into the coordinates of the target object.

Automation:

In the manual operation mode the user directs the LPS instrument to aim at the visible calibration features on the target object, but if active target markers, such as LEDs, are placed on the target object (as disclosed in U.S. patent application Ser. No. 13/921,246), then the measurement procedure can be automated. This works by using images from the LPS camera and an image processing differencing method to detect the active markers (LEDs) on the target. These marker locations will then be used to direct the LPS instrument to aim at the targets to acquire distance information for the required number of points (three) for use with the location difference method disclosed herein. With the use of active markers, the location difference method can be performed by a fully automated system.

Data Transfer:

The measurement results can be computed and sent to other applications. A measurement system of the type described above can be connected to other applications through a serial or network socket connection. This allows communication between the applications to send the results of the measurements, or other process events, such as instructing an LPS when to initiate the process. For example, this process can provide base location information to a robotic arm used in a manufacturing application.

Capturing Trends:

Acquiring position data for a large set of visible features on different instances of the same model of a target object, such as an airplane, would provide the raw data needed for statistical analysis. For example, this data could be used to determine trends for manufacturing quality control, or in-use check-ups (such as for fatigue or deformation analysis for failure prediction). The data can be aligned to a common reference frame using the post-measurement 3-D model alignment process disclosed above or using the basic relative differencing method disclosed earlier.

Use of the relative object localization process disclosed herein is especially important when 3-D data is not available, too hard to access, or difficult to work with (i.e., manipulating files, and not making mistakes). In some cases, where 3-D data points were required to use the original LPS process, this relative measurement mode could be used instead. This can reduce or eliminate the preparation time needed for those cases. For some LPS applications a set of known 3-D points will always be needed in order to give results in the proper coordinate system of the target object, but this new relative measurement mode opens up a new class of applications that were previously out of scope for LPS due to the requirement for known data points.

The above-described relative object localization process would be valuable to persons who perform measurements on objects without access to known 3-D reference point data. This includes industrial applications like manufacturing and inspection, where 3-D data may not be available or is difficult to acquire. These types of applications could be in areas such as: aerospace, architecture, construction, shipbuilding, and various types of forensics.

The relative object localization process also applies to consumer-level applications, where 3-D data is almost never available. For the average consumer the most common measurement instrument is a simple tape measure, which is difficult to use for moderate to complex measurement activities. The consumer-level applications could include indoor or outdoor uses, such as: measuring a room or the dimensions of a driveway, hanging a set of pictures on a wall in a specific configuration, indicating sewing patterns on pieces of cloth, laying out a baseball diamond, transferring a small-scale design or model to full-scale (or vice versa), etc.

While relative object localization processes have been described with reference to various embodiments, it will be understood by those skilled in the art that various changes may be made and equivalents may be substituted for elements thereof without departing from the scope of the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

As used in the claims, the term "location" comprises position in a fixed three-dimensional coordinate system and orientation relative to that coordinate system.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for performing an automated operation on a workpiece using a robot comprising a robot base, a robotic arm and an end effector, the method comprising:
   (a) placing a support device of a positioning system at a first location, the positioning system comprising a laser range meter, a pan-tilt mechanism supporting the laser range meter, a support device supporting the pan-tilt mechanism, and a computer that receives measurement data from the laser range meter and pan-tilt mechanism, wherein the positioning system has a frame of reference that is fixed relative to the support device;
   (b) using the laser range meter and the pan-tilt mechanism to measure respective distances and pan and tilt angles of first, second and third points on a first workpiece while the positioning system is at the first location and the first workpiece is at a second location, wherein the first, second and third points are non-collinear;
   (c) converting the distance and angle measurements acquired in step (b) into a first set of Cartesian coordinates representing the respective positions of the first, second and third points of the first workpiece in the frame of reference of the positioning system;
   (d) computing a first vector connecting the first and second points and a second vector connecting the first and third points in the frame of reference of the positioning system based on the first set of Cartesian coordinates;
   (e) generating a first transformation matrix representing a first location difference of the frames of reference of the positioning system at the first location and of the first workpiece at the second location based on the first and second vectors;
   (f) using the laser range meter and the pan-tilt mechanism to measure respective distances and pan and tilt angles of fourth, fifth and sixth points on a robot base of a robot while the positioning system is at the first location and the robot base is at a third location, wherein the fourth, fifth and sixth points are non-collinear;
   (g) converting the distance and angle measurements acquired in step (f) into a second set of Cartesian coordinates representing the respective positions of the fourth, fifth and sixth points of the robot base at the third location in the frame of reference of the positioning system;
   (h) computing a third vector connecting the third and fourth points and a fourth vector connecting the fourth and sixth points in the frame of reference of the positioning system based on the second set of Cartesian coordinates;
   (i) generating a second transformation matrix representing a second location difference of the frames of reference of the positioning system at the first location and of the robot base at the third location based on the third and fourth vectors;
   (j) computing a third location difference representing a difference between the second and third locations by multiplying one of the first and second transformation matrices by the inverse of the other of the first and second transformation matrices;
   (k) configuring a robot controller of the robot to control a robotic arm of the robot so that an end effector of the robot moves along a specific path relative to a workpiece when the robot base and the workpiece have a specified location difference;
   (l) inputting data representing the third location difference to the robot controller;
   (m) reconfiguring the robot controller to control movement of the robotic arm so that the end effector moves along the specific path relative to the first workpiece at the second location using the third location difference as an origin location offset to the specified location difference;
   (n) controlling movement of the robotic arm so that the end effector moves along the specific path relative to the first workpiece at the second location; and
   (o) controlling the end effector to perform an operation on the first workpiece at a position along the specific path relative to the first workpiece at the second location.

2. The method as recited in claim 1, wherein the operation is a machining operation.

3. The method as recited in claim 1, wherein the operation is an inspection operation.

4. The method as recited in claim 1, wherein the first workpiece is a fuselage or wing of an airplane.

5. The method as recited in claim 1, wherein coordinates of the first, second and third points of the first workpiece in the frame of reference of the first workpiece are not known beforehand.

6. The method as recited in claim 1, wherein the first, second and third points correspond to visible features of or markers on the first workpiece, and the fourth, fifth and sixth points correspond to visible features of or markers on the robot base.

7. The method as recited in claim 5, wherein the markers are light-emitting diodes.

8. The method as recited in claim 1, further comprising:
   (p) moving the positioning system from the first location to a fourth location;
   (q) using the laser range meter and the pan-tilt mechanism to measure respective distances and pan and tilt angles of the first, second and third points on the first workpiece while the positioning system is at the fourth location and the first workpiece is at the second location;

(r) converting the distance and angle measurements acquired in step (q) into a third set of Cartesian coordinates representing the respective positions of the first, second and third points on the first workpiece in the frame of reference of the positioning system;

(s) computing a fifth vector connecting the first and second points and a sixth vector connecting the first and third points in the frame of reference of the positioning system based on the third set of Cartesian coordinates;

(t) generating a third transformation matrix representing a fourth location difference of the frames of reference of the positioning system at the fourth location and of the first workpiece at the second location based on the fifth and sixth vectors;

(u) using the laser range meter and the pan-tilt mechanism to measure respective distances and pan and tilt angles of the fourth, fifth and sixth points on the robot base of the robot while the robot base is at a fifth location;

(v) converting the distance and angle measurements acquired in step (u) into a fourth set of Cartesian coordinates representing the respective positions of the fourth, fifth and sixth points of the robot base at the fifth location in the frame of reference of the positioning system;

(w) computing a seventh vector connecting the fourth and fifth points and an eighth vector connecting the fourth and sixth points in the frame of reference of the positioning system based on the second set of Cartesian coordinates;

(x) generating a fourth transformation matrix representing a fifth location difference of the frames of reference of the positioning system at the fourth location and of the robot base at the fifth location based on the seventh and eighth vectors;

(y) computing a sixth location difference representing a difference between the second and fifth locations by multiplying one of the third and fourth transformation matrices by the inverse of the other of the third and fourth transformation matrices;

(z) inputting data representing the sixth location difference to the robot controller;

(aa) reconfiguring the robot controller to control movement of the robotic arm so that the end effector moves along the specific path relative to the first workpiece at the second location using the sixth location difference as the origin location offset to the specified location difference;

(bb) controlling movement of the robotic arm so that the end effector moves along the specific path relative to the first workpiece at the second location; and (cc) controlling the end effector to perform an operation on the first workpiece at a position along the specific path relative to the first workpiece at the second location.

9. The method as recited in claim 8, wherein the robotic end effector is a sensor for measuring material thickness in between applications of material.

10. The method as recited in claim 1, further comprising:

(p) using the laser range meter and the pan-tilt mechanism to measure respective distances and pan and tilt angles of seventh, eighth and ninth points on a second workpiece while the positioning system is at the first location and the second workpiece is at a fourth location, wherein the seventh, eighth and ninth points are non-collinear;

(q) converting the distance and angle measurements acquired in step (p) into a third set of Cartesian coordinates representing the respective positions of the seventh, eighth and ninth points of the second workpiece in the frame of reference of the positioning system;

(r) computing a fifth vector connecting the seventh and eighth points and a sixth vector connecting the seventh and ninth points in the frame of reference of the positioning system based on the third set of Cartesian coordinates;

(s) generating a third transformation matrix representing a fourth location difference of the frames of reference of the positioning system at the first location and of the second workpiece at the fourth location based on the fifth and sixth vectors;

(t) using the laser range meter and the pan-tilt mechanism to measure respective distances and pan and tilt angles of the fourth, fifth and sixth points on the robot base of the robot while the robot base is at a fifth location;

(u) converting the distance and angle measurements acquired in step (t) into a fourth set of Cartesian coordinates representing the respective positions of the fourth, fifth and sixth points of the robot base at the fifth location in the frame of reference of the positioning system;

(v) computing a seventh vector connecting the third and fourth points and an eighth vector connecting the fourth and sixth points in the frame of reference of the positioning system based on the second set of Cartesian coordinates;

(w) generating a fourth transformation matrix representing a fifth location difference of the frames of reference of the positioning system at the first location and of the robot base at the fifth location based on the seventh and eighth vectors;

(x) computing a sixth location difference representing a difference between the fourth and fifth locations by multiplying one of the third and fourth transformation matrices by the inverse of the other of the third and fourth transformation matrices;

(y) inputting data representing the sixth location difference to the robot controller;

(z) reconfiguring the robot controller to control movement of the robotic arm so that the end effector moves along the specific path relative to the second workpiece at the fourth location using the sixth location difference as the origin location offset to the specified location difference;

(aa) controlling movement of the robotic arm so that the end effector moves along the specific path relative to the second workpiece at the fourth location; and (bb) controlling the end effector to perform an operation on the second workpiece at a position along the specific path relative to the second workpiece at the fourth location.

11. A method for performing an automated operation on a workpiece using a robot comprising a robot base, a robotic arm and an end effector, the method comprising:

(a) placing a support device of a positioning system at a first location, the positioning system comprising a laser range meter, a pan-tilt mechanism supporting the laser range meter, a support device supporting the pan-tilt mechanism, and a computer that receives measurement data from the laser range meter and pan-tilt mechanism, wherein the positioning system has a frame of reference that is fixed relative to the support device;

(b) using the laser range meter and the pan-tilt mechanism to measure respective distances and pan and tilt angles of first, second and third points on a first workpiece while the positioning system is at the first location and the first workpiece is at a second location, wherein the first, second and third points are non-collinear;

(c) converting the distance and angle measurements acquired in step (b) into a first transformation matrix representing a first location difference of the frames of reference of the positioning system at the first location and of the first workpiece at the second location;

(d) using the laser range meter and the pan-tilt mechanism to measure respective distances and pan and tilt angles of fourth, fifth and sixth points on a robot base of a robot while the positioning system is at the first location and the robot base is at a third location, wherein the fourth, fifth and sixth points are non-collinear;

(e) converting the distance and angle measurements acquired in step (d) into a second transformation matrix representing a second location difference of the frames of reference of the positioning system at the first location and of the robot base at the third location;

(f) computing a third location difference representing a difference between the second and third locations by multiplying one of the first and second transformation matrices by the inverse of the other of the first and second transformation matrices;

(g) configuring a robot controller of the robot to control a robotic arm of the robot so that an end effector of the robot moves along a specific path relative to a workpiece when the robot base and the workpiece have a specified location difference;

(h) inputting data representing the third location difference to the robot controller;

(i) reconfiguring the robot controller to control movement of the robotic arm so that the end effector moves along the specific path relative to the first workpiece at the second location using the third location difference as an origin location offset to the specified location difference;

(j) controlling movement of the robotic arm so that the end effector moves along the specific path relative to the first workpiece at the second location; and (k) controlling the end effector to perform an operation on the first workpiece at a position along the specific path relative to the first workpiece at the second location.

12. The method as recited in claim 11, wherein the operation is a machining operation.

13. The method as recited in claim 11, wherein the operation is an inspection operation.

14. The method as recited in claim 11, wherein coordinates of the first, second and third points of the first workpiece in the frame of reference of the first workpiece are not known beforehand.

15. The method as recited in claim 11, wherein the first, second and third points correspond to visible features of or markers on the first workpiece, and the fourth, fifth and sixth points correspond to visible features of or markers on the robot base.

16. The method as recited in claim 15, wherein the markers are light-emitting diodes.

17. The method as recited in claim 11, further comprising:

(l) moving the positioning system from the first location to a fourth location;

(m) using the laser range meter and the pan-tilt mechanism to measure respective distances and pan and tilt angles of the first, second and third points on the first workpiece while the positioning system is at the fourth location and the first workpiece is at the second location;

(n) converting the distance and angle measurements acquired in step (m) into a third transformation matrix representing a fourth location difference of the frames of reference of the positioning system at the fourth location and of the first workpiece at the second location;

(o) using the laser range meter and the pan-tilt mechanism to measure respective distances and pan and tilt angles of the fourth, fifth and sixth points on the robot base of the robot while the robot base is at a fifth location;

(p) converting the distance and angle measurements acquired in step (o) into a fourth transformation matrix representing a fifth location difference of the frames of reference of the positioning system at the fourth location and of the robot base at the fifth location;

(q) computing a sixth location difference representing a difference between the second and fifth locations by multiplying one of the third and fourth transformation matrices by the inverse of the other of the third and fourth transformation matrices;

(r) inputting data representing the sixth location difference to the robot controller (s) reconfiguring the robot controller to control movement of the robotic arm so that the end effector moves along the specific path relative to the first workpiece at the second location using the sixth location difference as the origin location offset to the specified location difference;

(aa) controlling movement of the robotic arm so that the end effector moves along the specific path relative to the first workpiece at the second location; and (bb) controlling the end effector to perform an operation on the first workpiece at a position along the specific path relative to the first workpiece at the second location.

18. The method as recited in claim 17, wherein the end effector is a microwave sensor for measuring paint thickness in between applications.

19. The method as recited in claim 11, further comprising:

(p) using the laser range meter and the pan-tilt mechanism to measure respective distances and pan and tilt angles of seventh, eighth and ninth points on a second workpiece while the positioning system is at the first location and the second workpiece is at a fourth location, wherein the seventh, eighth and ninth points are non-collinear;

(q) converting the distance and angle measurements acquired in step (p) into a third transformation matrix representing a fourth location difference of the frames of reference of the positioning system at the first location and of the second workpiece at the fourth location;

(r) using the laser range meter and the pan-tilt mechanism to measure respective distances and pan and tilt angles of the fourth, fifth and sixth points on the robot base of the robot while the robot base is at a fifth location;

(s) converting the distance and angle measurements acquired in step (t) into a fourth transformation matrix representing a fifth location difference of the frames of reference of the positioning system at the first location and of the robot base at the fifth location;

(t) computing a sixth location difference representing a difference between the fourth and fifth locations by multiplying one of the third and fourth transformation matrices by the inverse of the other of the third and fourth transformation matrices;

(u) inputting data representing the sixth location difference to the robot controller;

(v) reconfiguring the robot controller to control movement of the robotic arm so that the end effector moves along the specific path relative to the second workpiece at the fourth location using the sixth location difference as the origin location offset to the specified location difference;

(w) controlling movement of the robotic arm so that the end effector moves along the specific path relative to the second workpiece at the fourth location; and (x) controlling the end effector to perform an operation on the second workpiece at a position along the specific path relative to the second workpiece at the fourth location.

20. A method for performing an automated operation on a workpiece using a robot comprising a robot base, a robotic arm and an end effector, the method comprising:

(a) placing a support device of a positioning system at a first location, the positioning system comprising a laser range meter, a pan-tilt mechanism supporting the laser range meter, a support device supporting the pan-tilt mechanism, and a computer that receives measurement data from the laser range meter and pan-tilt mechanism, wherein the positioning system has a frame of reference that is fixed relative to the support device;

(b) using the laser range meter and the pan-tilt mechanism to measure respective distances and pan and tilt angles of first, second and third points on a workpiece while the positioning system is at the first location and the workpiece is at a second location, wherein the first, second and third points are non-collinear;

(c) converting the distance and angle measurements acquired in step (b) into a first transformation matrix representing a first location difference of the frames of reference of the positioning system at the first location and of the workpiece at the second location;

(d) using the laser range meter and the pan-tilt mechanism to measure respective distances and pan and tilt angles of fourth, fifth and sixth points on a robot base of a robot while the positioning system is at the first location and the robot base is at a third location, wherein the fourth, fifth and sixth points are non-collinear;

(e) converting the distance and angle measurements acquired in step (d) into a second transformation matrix representing a second location difference of the frames of reference of the positioning system at the first location and of the robot base at the third location;

(f) computing a third location difference representing a difference between the second and third locations by multiplying one of the first and second transformation matrices by the inverse of the other of the first and second transformation matrices;

(g) inputting data representing the third location difference to the robot controller;

(h) controlling movement of the robotic arm so that the end effector moves along a specific path relative to the workpiece at the second location using the third location difference as an origin location offset to a specified location difference programmed into the robot controller; and (i) controlling the end effector to perform a machining or inspection operation on the workpiece at a position along the specific path relative to the workpiece at the second location.

* * * * *